United States Patent [19]

Lees, Sr. et al.

[11] Patent Number: 5,979,231
[45] Date of Patent: Nov. 9, 1999

[54] LOADWHEEL ASSEMBLY FOR TIRE TESTING SYSTEMS HAVING CONICAL SUPPORT PLATES

[75] Inventors: David W. Lees, Sr., Ravenna; Francis J. Bormet, Tallmadge; Richard Cukelj, Strongsville; Frank R. Jellison, Canton; Keith A. Neiferd, Norton; Dennis Allyn Reynolds, Munroe Falls; Christy Quinn, Doylestown, all of Ohio

[73] Assignee: Illinois Tool Works, Inc., Glenview, Ill.

[21] Appl. No.: 08/988,509

[22] Filed: Dec. 10, 1997

Related U.S. Application Data

[60] Provisional application No. 60/036,717, Jan. 24, 1997.
[51] Int. Cl.$^6$ .................................................. G01M 17/02
[52] U.S. Cl. ............................................................. 73/146
[58] Field of Search ................................................ 73/146

[56] References Cited

U.S. PATENT DOCUMENTS 2,771,176  11/1956  Clark et al. .
2,781,119  2/1957  Talbot et al. .
2,901,085  8/1959  McCoy .

(List continued on next page.)

FOREIGN PATENT DOCUMENTS 2 104 010  3/1983  United Kingdom ..................... 73/146

OTHER PUBLICATIONS

One page advertisement showing a prior tire testing machine, Akron Special Machinery, Inc., date unknown.
One page advertisement showing a prior tire testing machine known as X75–13 TUO, Akron Special Machinery, Inc., date unknown.

Exhibit 1—photograph of a prior tire testing machine known as M–82.

(List continued on next page.)

Primary Examiner—Joseph L. Felber
Attorney, Agent, or Firm—Watts, Hoffman, Fisher & Heinke Co.

[57] ABSTRACT

A loadwheel assembly for a tire testing machine includes a loadwheel with a tire contacting surface supported along substantially its entire circumference by one or more solid discs. The loadwheel consistently measures forces and generates electrical signals corresponding to the forces to more precisely determine tire uniformity. The loadwheel, formed as an aluminum weldment which reduces manufacturing costs, rotates about spindles provided with load cells and mounted to a C-shaped carriage. The carriage has upper and lower legs with the spindles fixed to one side of each leg such that the load cells are easily accessible from one side of the carriage. The top and bottom legs of the carriage are selectively attachable to a guide piece that slidably engages a complementarily shaped member secured to the machine frame to permit the carriage to be secured to the frame with the load cells disposed on either side of the carriage legs, thereby providing access to the load cells regardless of the layout of the machine. The loadwheel assembly includes a motor and gearbox integrated with and directly driving a ball screw connected to the carriage to move the loadwheel toward and away from the tire under test.

19 Claims, 9 Drawing Sheets

U.S. PATENT DOCUMENTS

| | | |
|---|---|---|
| 3,081,959 | 3/1963 | Goodwin . |
| 3,089,576 | 5/1963 | Sauer et al. . |
| 3,102,627 | 9/1963 | Acton et al. . |
| 3,221,364 | 12/1965 | Bailey et al. . |
| 3,244,575 | 4/1966 | Sabo et al. . |
| 3,346,434 | 10/1967 | Fulton . |
| 3,687,260 | 8/1972 | Willows . |
| 3,817,003 | 6/1974 | Monajjem . |
| 3,837,689 | 9/1974 | Csatlos . |
| 3,849,942 | 11/1974 | Monajjem . |
| 3,914,907 | 10/1975 | Hofelt, Jr. et al. . |
| 4,023,407 | 5/1977 | Vanderzee . |
| 4,024,372 | 5/1977 | Herrmann . |
| 4,191,055 | 3/1980 | Orem et al. . |
| 4,241,300 | 12/1980 | Hayes et al. . |
| 4,458,527 | 7/1984 | McFarland et al. . |
| 4,489,598 | 12/1984 | Beebe et al. . |
| 4,576,040 | 3/1986 | Cargould . |
| 4,638,756 | 1/1987 | Collmann . |
| 4,702,287 | 10/1987 | Higble et al. . |
| 4,704,900 | 11/1987 | Beebe . |
| 4,723,563 | 2/1988 | Kane . |
| 4,785,864 | 11/1988 | Cargould et al. . |
| 4,805,125 | 2/1989 | Beebe . |
| 4,815,004 | 3/1989 | Beebe . |
| 4,846,334 | 7/1989 | Cargould . |
| 4,852,398 | 8/1989 | Cargould et al. . |
| 4,870,858 | 10/1989 | Smith et al. . |
| 4,885,936 | 12/1989 | Hayes . |
| 4,896,531 | 1/1990 | Hayes . |
| 4,976,141 | 12/1990 | Cargould et al. . |
| 5,027,649 | 7/1991 | Himmler . |
| 5,029,467 | 7/1991 | Cargould . |
| 5,067,348 | 11/1991 | Himmler et al. .................... 763/146 X |
| 5,107,702 | 4/1992 | Iwama . |
| 5,378,273 | 1/1995 | Taguchi et al. . |
| 5,390,540 | 2/1995 | Mallison . |
| 5,481,907 | 1/1996 | Chasco et al. ............................. 73/146 |
| 5,566,816 | 10/1996 | Gross et al. . |
| 5,605,215 | 2/1997 | Gross et al. . |

OTHER PUBLICATIONS

Exhibit 2—photograph of a prior tire testing machine known as FD90.

Exhibits 3–4, photographs of a prior tire testing machine known as D90.

Exhibit 5—photograph of a prior tire testing machine known as D92.

Exhibits 6–7, photographs of a prior tire uniformity machine, Model 2D80.

Exhibit 8—photograph of a prior tire testing machine.

Exhibits 9–24—photographs of a prior tire testing machine known as D70.

Eagle Picher, Akron Standard Division, product brochure submitted in its entirety, entitled "Are you really saving when you buy used Tire Uniformity Machines?Or . . . ", date unknown.

2 page product brochure of a prior tire testing machine entitled "Tire Uniformity Equipment", date unknown.

Eagle Picher, Akron Standard Division, product brochure submitted in its entirety, entitled "The Standard of the World", date unknown.

Advertisement showing a prior tire testing machine known as 2D80.

A copy of an Akron Standard product brochure entitled "Setting The Standards for the World", submitted in its entirety, date unknown.

Akron Standard product brochure for a prior tire testing machine known as Model 70 TUO, Dec., 1973.

Akron Standard Sales Specification for Tire Uniformity Machine Model D90, Jan. 1990.

Akron Standard Sales Specification for Tire Uniformity Machines, Series D70, Apr. 1997.

Exhibits 25–28 from Kobe Steel, Ltd., drawing showing a prior tire testing machine known as PC–UXO–P2, date unknown.

Exhibitsn 29–39 from Hofmann Maschinenbau Gmbh, drawing showing prior tire testing machines, copyright 1994.

Fig.6

LOADWHEEL ASSEMBLY FOR TIRE TESTING SYSTEMS HAVING CONICAL SUPPORT PLATES

This application claims benefit of provisional Application. 60/036,717 filed Jan. 24, 1997.

TECHNICAL FIELD

The present invention relates to loadwheel assemblies for sensing forces. More particularly, the invention relates to an improved loadwheel assembly for measuring forces exerted by a tire being tested by a tire uniformity testing machine.

BACKGROUND ART

Tire testing systems for determining the presence of irregularities or non-uniformities in tires are known in the art. Conventional systems typically move a tire to a testing station where it is engaged by some form of chuck assembly and inflated to its normal pressure. The tire is rotated at its normal speed and contacted by a loadwheel which is free to rotate about an axis parallel to the rotational axis of the tire. The loadwheel has spindles at its opposite ends provided with load cells which measure forces acting on the loadwheel in directions of interest. Precise measurement of the forces exerted by the tire permits accurate adjustment of the uniformity of the tire after the force measuring procedure, for example, by grinding devices which remove excess tire material to correct any irregularities that may have arisen during the manufacturing process.

Conventional tire testing systems such as that described above are disclosed in, for example, U.S. Pat. Nos. 4,704,900 and 4,805,125. In these systems, the loadwheel spindles are provided with load cells and secured to a movable carriage. The carriage is attached to a ball screw housed in a screw shaft, the screw shaft being rotated by a chain-sprocket assembly driven by a motor and gear reduction unit. Rotation of the screw shaft moves the ball screw and carriage toward or away from the tire being tested, the carriage sliding along the frame of the machine. A servo-mechanism moves the carriage to a desired position based on the force signals generated by the load cells.

Although prior art tire testing systems, and in particular known loadwheel assemblies used therewith, measure tire uniformity in an acceptable manner, several drawbacks exist so as to leave room for improvement. In conventional systems the loadwheel is rotatably mounted on a C-shaped carriage such that the rotational axis of the loadwheel passes through the two horizontal legs of the "C." The end portion of each horizontal leg of the carriage is provided with mounting structure for attachment of the loadwheel spindles. More particularly, the spindles are attached to the side of each horizontal leg of the carriage. As such, the load cells carried by the spindles are only accessible from one side of the carriage legs. Consequently, the load cells can be accessed only from one side of the frame of the testing machine because the horizontal carriage legs prevent access from the other side of the frame.

In view of the fact that the load cells have a limited useful life, they must at times be replaced to ensure proper operation of the machine. The limited access to load cells in prior art machines poses an obstacle to replacement should access from the one side of the machine frame be difficult or unavailable, for example, due to intervening structure of the testing system or the environment in which the machine is located. Accordingly, there is a need in the art for an improved loadwheel assembly that allows easy replacement of the load cells despite the specific layout of the machine.

Another drawback affecting operation of prior art loadwheel assemblies relates to the structure of the loadwheel. Specifically, conventional loadwheels comprise a cylindrical wall (the outer surface of which contacts the rotating tire) and a hub connected to the wall by a plurality of plates or spoke-like ribs. For example, one commonly used loadwheel includes twelve ribs extending between the outer wall and the hub. Such construction has sometimes resulted in inaccurate measurement of the force exerted on the loadwheel by the tire. Further, a loadwheel having a plurality of ribs may experience harmonic related problems during use. In addition, prior art loadwheels like those discussed above typically are formed by an expensive casting process, e.g. magnesium casting, which increases the cost of the testing machine.

Further, in conventional loadwheel assemblies the carriage is moved toward and away from the rotating tire by a motor and gearbox mounted to the machine frame. A sprocket and chain assembly mounted to the frame transfers the motor output to a screw assembly to move the carriage and loadwheel. Keeping in mind that tire testing machines are relatively complicated apparatus, the sprocket and chain assembly constitutes an additional component requiring maintenance and increases the susceptibility of the machine to breakdown. As such, provision of the sprocket assembly increases the likelihood of machine downtime which adversely affects tire testing efficiency.

Accordingly, there is a need in the art for an improved loadwheel assembly that overcomes limitations of conventional tire testing machines, provides increased flexibility in maintaining and servicing the machine, simplifies the overall construction of the machine, and accurately measures forces generated by the tire.

SUMMARY OF THE INVENTION

The invention provides a loadwheel assembly for use in tire testing machines that determine whether the roundness, mechanical uniformity, etc., of the tire are acceptable. The loadwheel is rotatably mounted on a carriage which is movable toward and away from the tire being tested. The rotating tire contacts the outer surface of the loadwheel and rotates the loadwheel about spindles extending from opposite ends thereof. The spindles are provided with load cells which effectively measure forces exerted on the loadwheel by the tire. In this manner, irregularities in the tire are sensed by the load cells which generate electrical signals used to measure the size, location, etc., of the irregularities. The machine preferably is equipped with suitable devices, e.g. grinders, for removing excess tire material to adjust the uniformity of the tire.

The loadwheel spindles are fixed to the movable carriage such that the load cells are easily accessible from one side of the carriage. The carriage has a guide piece attached to a mounting plate fixed to the bottom of the carriage, the guide piece slidably engaging a complementarily shaped member secured to the machine frame to allow the carriage and loadwheel to move toward the tire under test. The top of the carriage also is provided with a mounting plate to which the guide piece may be attached. This aspect of the invention permits the carriage to be secured with the load cells disposed on either side of the machine frame, and thus overcomes problems caused by the construction or layout of prior art testing systems which allow the carriage to be accessed from only one side of the machine, for example due to various system components preventing one from reaching the opposite side of the carriage. Regardless of which side of the frame permits access to the carriage, according to the invention the carriage may be mounted with either the top or bottom thereof secured to the frame, thus providing easy access to the load cells irrespective of the system layout.

The invention also provides an improved loadwheel construction which produces accurate, consistent force measurements. The loadwheel is constructed such that the outer wall engaging the tire is supported over its entire periphery by conical plates. This provides a strong, lightweight construction and results in consistent measurement of forces and generation of electrical signals corresponding to the forces, which in turn allows more precise determinations of tire uniformity. Additionally, the loadwheel preferably is formed as an aluminum weldment in order to reduce manufacturing cost, as compared with prior art loadwheels which typically are formed by an expensive casting process (e.g. a magnesium casting).

In yet another aspect of the invention, the loadwheel assembly includes a drive mechanism comprising a motor and gearbox whose output is directly connected to and rotates a threaded sleeve. A ball screw is received in the sleeve and has an end attached to the loadwheel carriage. Upon actuation of the motor, the sleeve rotates to drive the ball screw and carriage in a linear direction. This assembly includes fewer components than prior art drive mechanisms and thus is less susceptible to mechanical failure.

Other features, benefits and advantages of the invention will be apparent from the following detailed description of preferred embodiments thereof taken in conjunction with the following drawing figures.

DETAILED DESCRIPTION OF PREFERRED EMBODIMENTS

Figure 1:
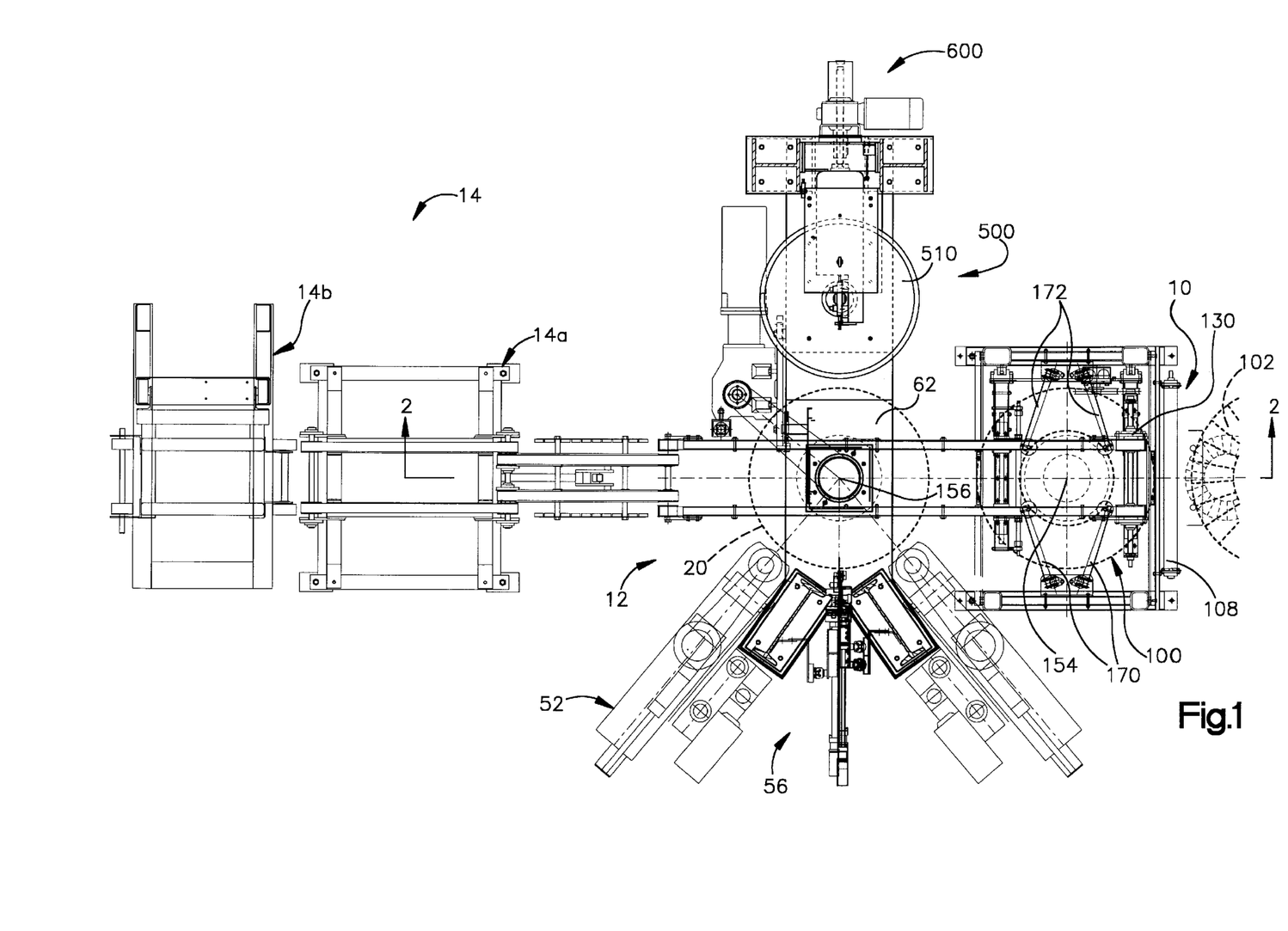
FIG. 1 is a plan view of a tire testing system including a tire testing station and loadwheel assembly constructed according to a preferred embodiment of the present invention.

FIG. 1 illustrates (in plan view) the overall arrangement of a tire testing system including a loadwheel assembly constructed according to a preferred embodiment of the invention. The overall tire testing system is more fully described in co-pending application Ser. No. 08/988,480, filed Dec. 10, 1997 and entitled TIRE UNIFORMITY TESTING SYSTEM, the subject matter of which is hereby incorporated by reference. Accordingly, the detailed description which follows relates primarily to the loadwheel assembly; however, for sake of clarity and in order to set forth the environment in which the loadwheel assembly is primarily intended for use, the overall system is discussed briefly below.

Those skilled in the art will appreciate that the loadwheel assembly of the invention is not limited in use to a tire testing machine as disclosed herein. That is, the loadwheel assembly may be used in tire testing machines other than the type specifically disclosed herein and, in addition, may find application in measuring forces exerted by rotating (or non-rotating) loads other than tires being subjected to a uniformity testing procedure. With this in mind, the loadwheel assembly disclosed herein should not be construed as necessarily being limited to any particular environment.

Figure 2:
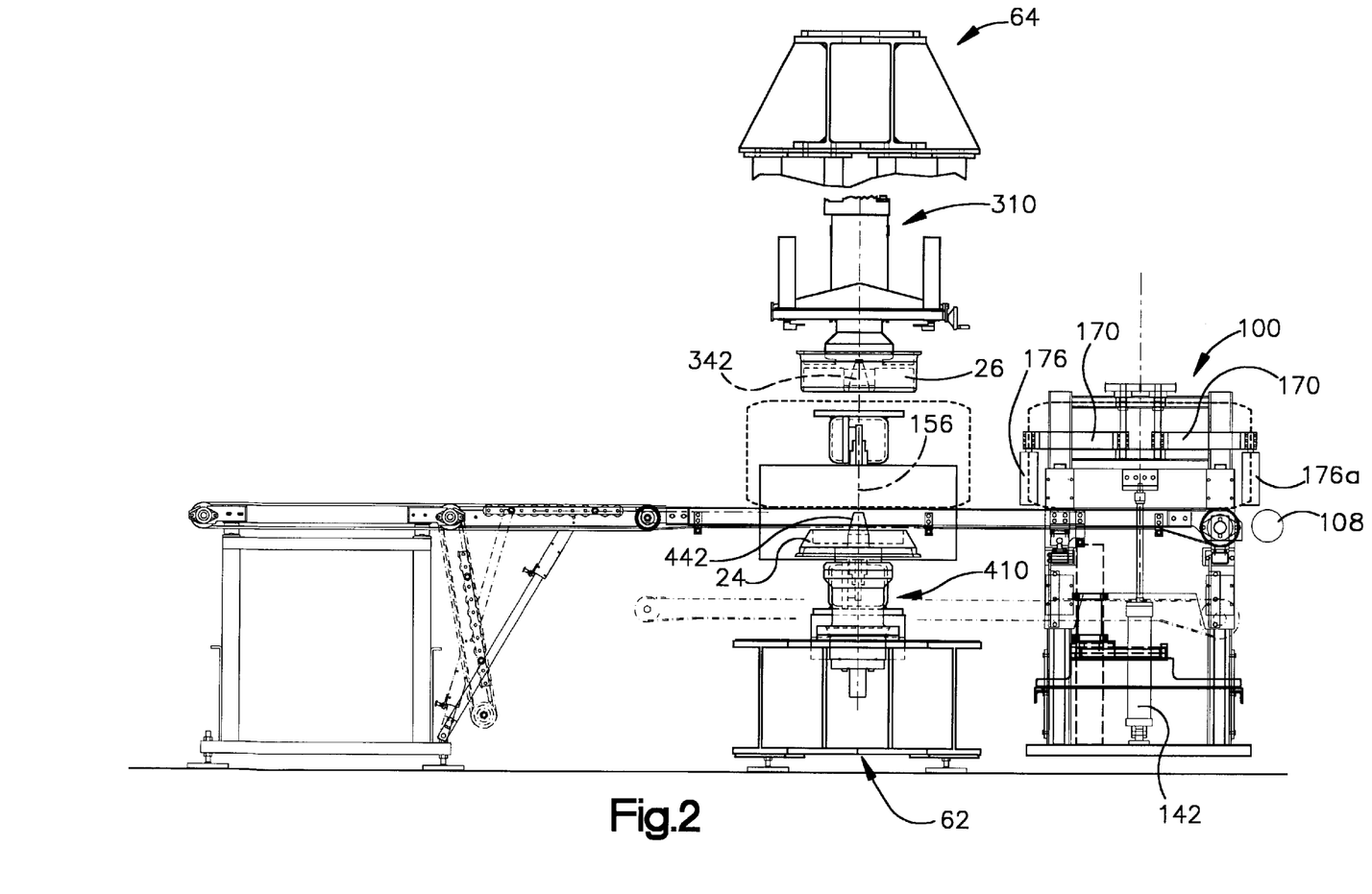
FIG. 2 is a fragmentary front elevational view of the tire testing system shown in FIG. 1.
Figure 3:
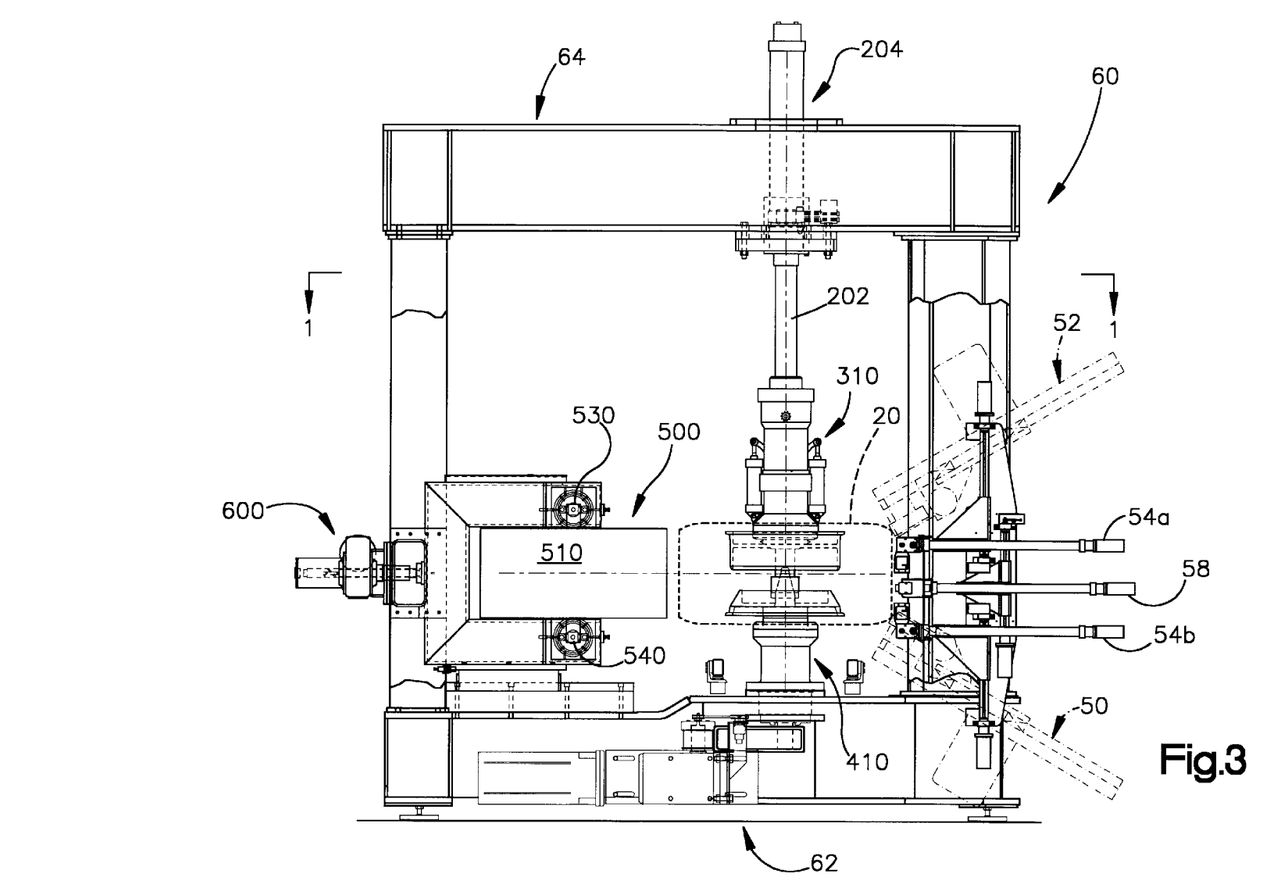
FIG. 3 is a side elevational view of the tire testing station and loadwheel assembly shown in FIGS. 1 and 2, the loadwheel carriage being shown in a retracted position away from the tire.

Referring to FIG. 1, the overall tire testing system comprises the following subsystems: an inlet conveyor 10, a testing station 12, an exit module 14, and an optional marking station 14a and tire sorting mechanism 14b. A tire positioned at the testing station 12 is tested and optionally ground to adjust the roundness, mechanical uniformity and/or any other physical properties of the tire. In FIG. 1, a tire indicated by reference character 20 (shown in phantom) is delivered to the testing station by the inlet conveyor 10 so that the tire is clamped between lower and upper rims 24, 26 of an automatic, adjustable width chuck apparatus (FIGS. 2 and 3). The rims 24, 26 form, respectively, part of a spindle assembly 410 and a movable chuck assembly 310 which comprise the chuck apparatus. The chuck assembly 310 includes conical recess 342 which receives tapered nose 442 of spindle assembly 410. The automatic, adjustable width chuck apparatus of the tire testing system is more fully described in co-pending application Ser. No. 08/988,119, filed on Dec. 10, 1997 and entitled AUTOMATIC ADJUSTABLE WIDTH CHUCK APPARATUS FOR TIRE TESTING SYSTEMS, the subject matter of which is hereby incorporated by reference.

The tire is clamped between the rims 24, 26 and inflated via the chuck apparatus. After inflation, the loadwheel assembly of the present invention is moved into abutting relationship with the outer surface of the tire 20. The loadwheel assembly, discussed in detail below, is indicated generally by the reference character 500 and includes loadwheel 510. As is conventional, the tire is rotated against the loadwheel 510 which monitors the load exerted by the tire via load cells 530, 540 (as seen in FIG. 3). As is known in the art, the data taken from the load cells is used to determine the uniformity of the tire. If desired, adjustments to the uniformity of the tire are made by one or more grinders, indicated generally by the reference characters 50, 52.

A probe system, indicated generally by the reference character 56, may form part of the testing station and in the illustrated embodiment (as seen best in FIG. 3) includes upper and lower side wall sensor assemblies 54a, 54b, upper and lower shoulder sensors (not shown) and a center tread sensor 58. The probe system is more fully disclosed in co-pending application Ser. No. 08/988,480, filed on Dec. 10, 1997 and entitled TIRE UNIFORMITY TESTING SYSTEM, the subject matter of which is hereby incorporated by reference.

Figure 4:
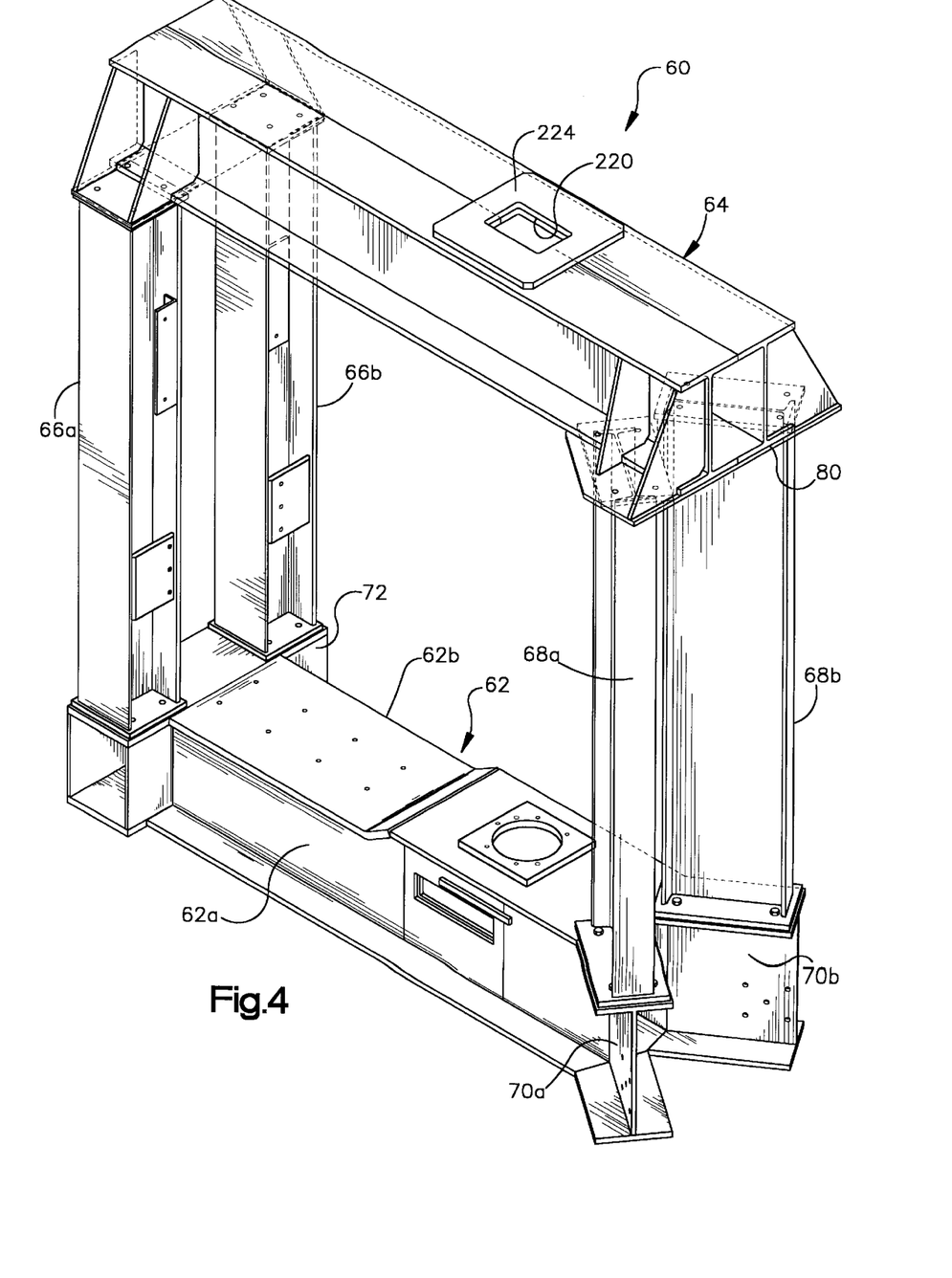
FIG. 4 is a perspective view of a frame forming part of the tire testing station shown in FIG. 3.

The chuck apparatus including spindle assembly 410 and chuck assembly 310, loadwheel assembly 500 including loadwheel 510, tire grinders 50, 52, and probe system 56 are mounted to a gantry-like frame system indicated generally by the reference character 60 (FIGS. 3 and 4). In the illustrated and preferred embodiment, the frame includes a base 62, and a cross beam 64 supported a predetermined distance above the base by pairs of columns 66a, 66b and 68a, 68b. The base 62 comprises a pair of horizontal I-beams preferably welded together to form a unitary member. As seen in FIG. 4, in the preferred embodiment, one end of the base 62 is configured as a "Y" (as viewed in plan) and includes end sections 70a, 70b, whereas an opposite end of the base 62 is configured as a "T" and includes cross beam 72. The frame 60 is described more fully in the aforementioned co-pending application relating to the overall tire testing system.

The inlet conveyor 10 (FIGS. 1 and 2) conveys tires to be tested from a centering station indicated generally by the reference character 100 to the testing station 12. In operation, a tire to be tested is delivered to the entrance of the centering station 100 by a belt or roller conveyor (not shown). FIG. 1 illustrates a tire, indicated in phantom by the reference character 102, about to be delivered to the inlet conveyor. The inlet conveyor includes a feed or kick roll 108 which moves the delivered tire onto the inlet conveyor mechanism. In operation, a tire is delivered to the centering station 100 by the kick roll 108 and then is centered with respect to an axis indicated by the reference character 154. In the preferred embodiment, the centering axis 154 is located a fixed distance from a test station axis 156 (FIGS. 1 and 2) which, in the preferred embodiment, corresponds to the rotational axis of the spindle assembly 410. Accordingly, after a tire is centered at the centering station 100 it is delivered so as to be in alignment with the spindle assembly. With this arrangement, the distance which the tire is moved from the centering station to the test station is the same for all tires regardless of their diameter.

The operation of the inlet conveyor will now be described. Prior to receiving a tire at the centering station, the conveyor unit is lowered by the actuator 142. A tire is driven onto a conveyor by the inlet kick roll 108. Once in the centering station 100, the centering arm actuator (not shown) is actuated to drive centering arms 170, 172 toward the tire until the rollers 176, 176a engage the tire periphery. If a lubricator is present, one of the rollers 176a is rotated in order to rotate the tire at the centering station thereby enabling the lubricator to apply a lubricant to the tire 20. Once centered, the conveyor unit is raised by actuator 142 thereby picking up the tire and, in effect, raising it above the support conveyor.

Each roller 176, 176a is mounted such that it can be moved vertically a predetermined distance in order to accommodate relative movement between the tire and the centering arms 170, 172 as the conveyor assembly engages and lifts the tire. The centering arms are then moved outwardly to their retracted positions, and the tire to be tested is supported by the conveyor unit and centered with respect to the axis 154; the tire also is located a predetermined distance from the axis 156 of the spindle assembly 410. The conveyor then is actuated to advance the tire a predetermined distance which positions the tire coincident with the axis 156 of the spindle 410. The actuator 142 then is activated to lower the conveyor unit which, in effect, lowers the tire onto the spindle. While the conveyor unit is in the lower position, another tire may be brought into the centering station and subsequently lubricated and centered during the time a tire is being tested at the testing station 12. The inlet conveyor also is described more fully in the aforesaid co-pending application relating to the overall tire testing system.

Figure 5:
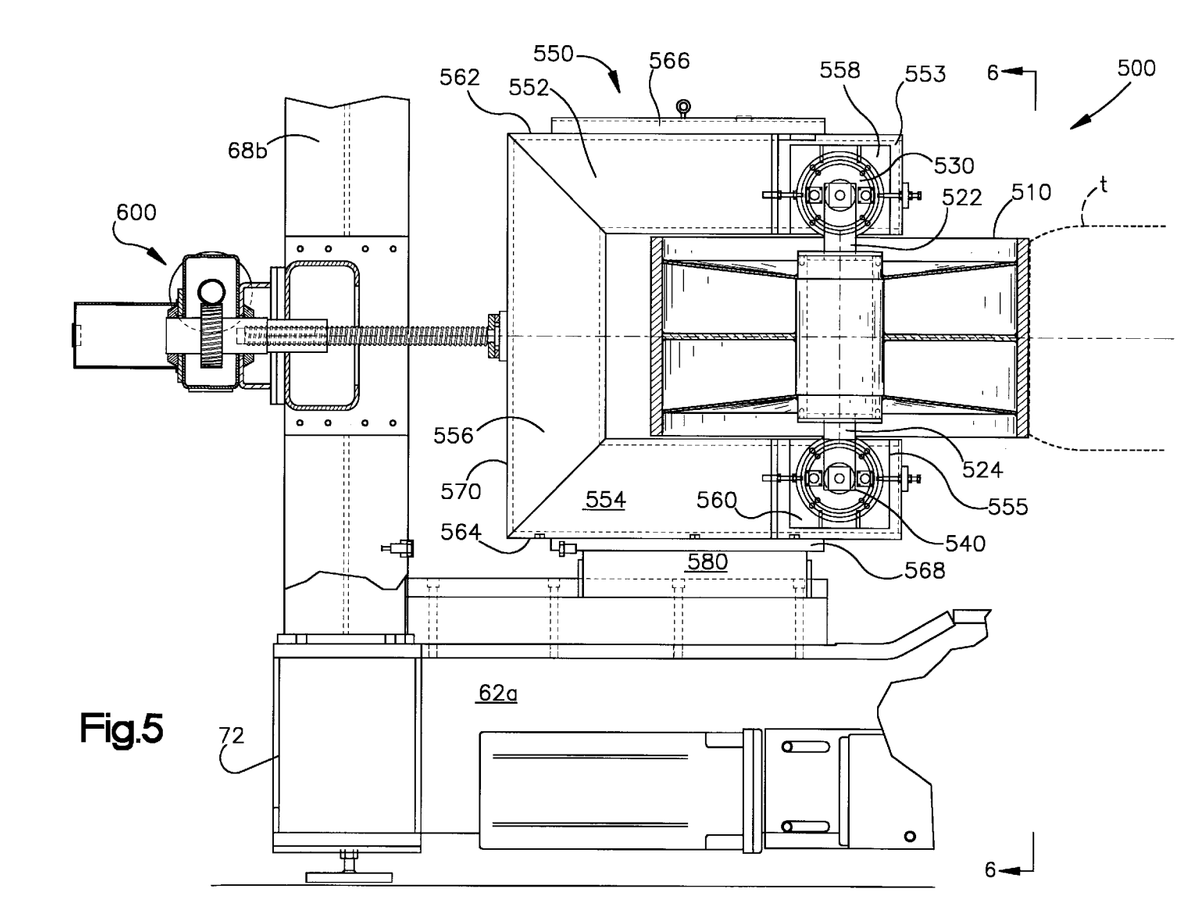
FIG. 5 is a side elevational view of the loadwheel assembly forming part of the tire testing station shown in FIG. 3, the loadwheel carriage being shown in an extended position engaging the tire.
Figure 5A:
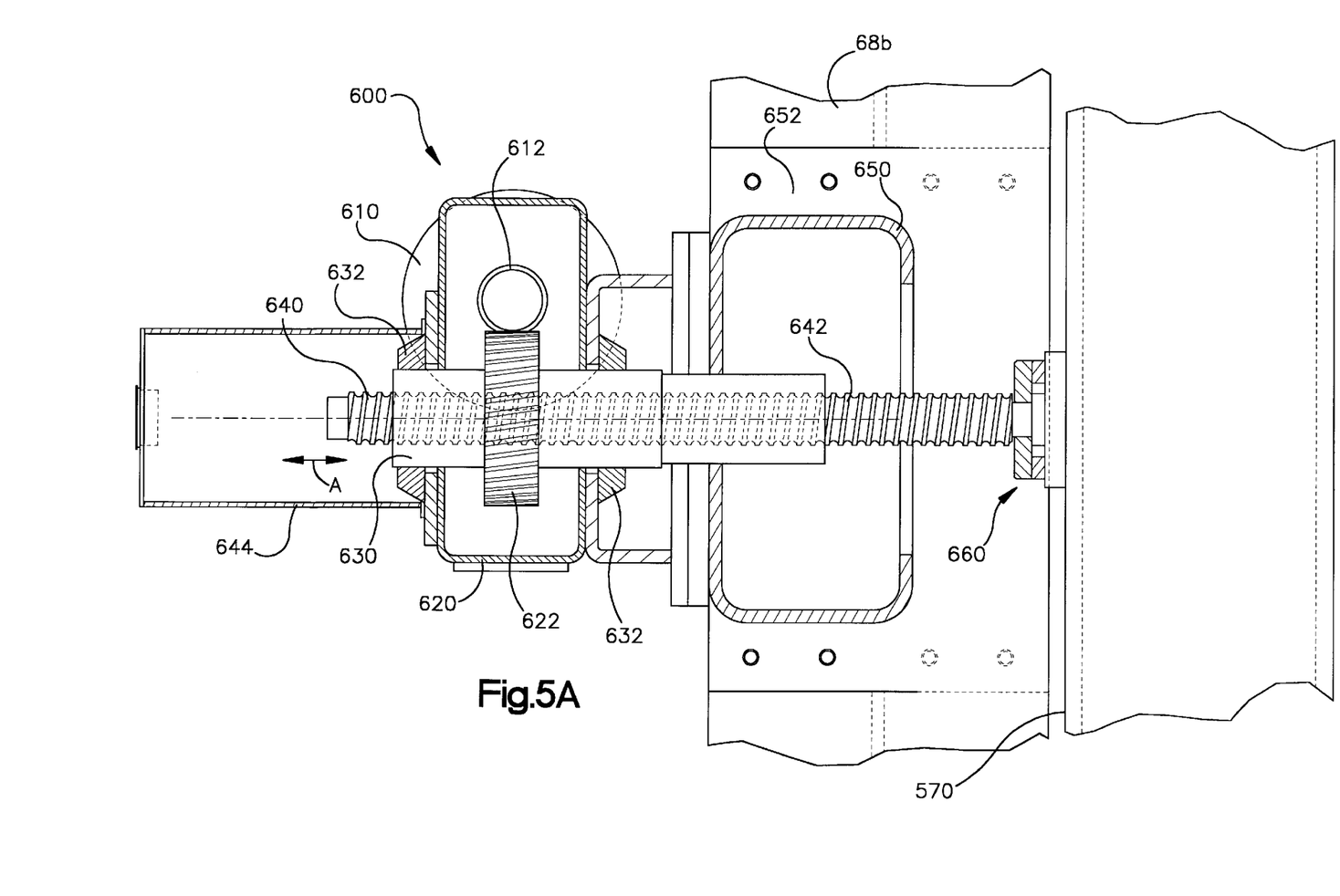
Figure 8:
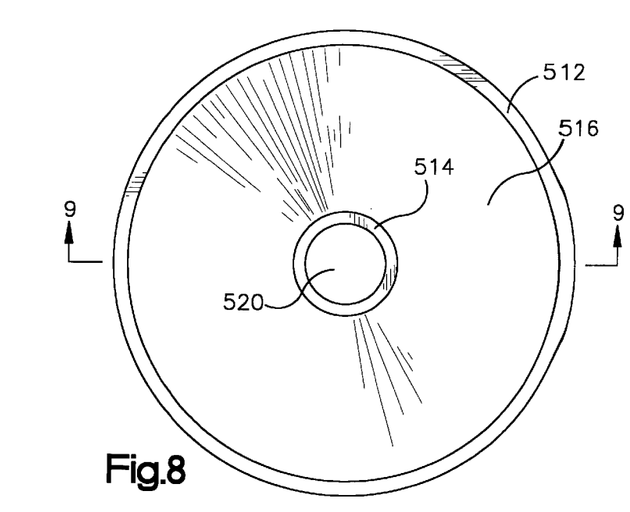
FIG. 8 is a plan view of a loadwheel constructed according to a preferred embodiment of the invention.

The loadwheel assembly, indicated generally by reference character 500, will now be described. Referring to FIG. 5, loadwheel assembly 500 can be characterized as comprising three main components, namely, loadwheel 510, C-shaped carriage 550, and drive mechanism 600. The loadwheel 510 includes a cylindrical outer wall 512 the exterior surface of which contacts the rotating tire held by the chuck assembly, as is known in the art. According to the invention, outer wall 512 of loadwheel 510 is connected to a hub 514 defining a hollow bore 520, as best seen in FIG. 8 (which does not show the loadwheel spindles). Hub 514 is joined to outer wall 512 by a plurality of solid, annular discs 516, 518. In a preferred embodiment, discs 516 are disposed between the hub 514 and outer wall 512 near the opposite ends thereof closing off the hollow interior of the loadwheel, while disc 518 is disposed between the central portions of hub 514 and wall 512.

Figure 9:
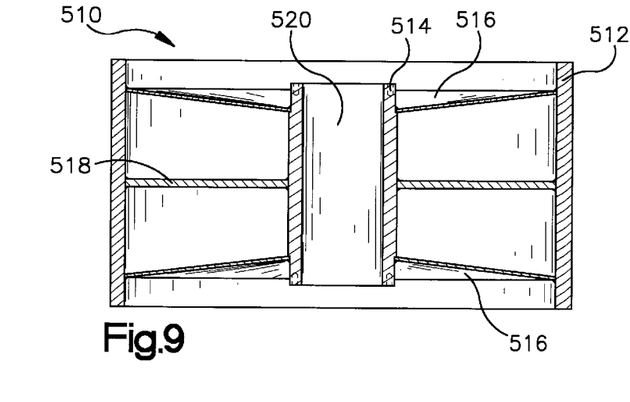
FIG. 9 is a sectional view of the loadwheel taken along the direction of arrows 9—9 in FIG. 8.

As seen from FIGS. 8 and 9, the discs 516, 518 support the outer wall 512 around the entire periphery thereof. This construction results in consistent, precise measurement of the forces exerted by the rotating tire against wall 512 due to there being no areas of the wall unsupported, as the discs engage the entire interior thereof. Prior art Loadwheels include spokes or ribs extending between the hub and outer wall so as to support the wall at spaced locations, resulting in areas between these locations being more susceptible to deflection under load of the tire. Consequently, as the rotating tire contacts the prior art loadwheel, the forces transferred from the outer wall to the spindles (equipped with the load cells) may vary over the circumference of the wheel, which may generate electrical signals not truly representative of the location or magnitude of irregularities in the tire. In contrast, the loadwheel of the invention accurately senses the forces exerted by the tire so as to precisely detect any irregularities therein. Additionally, unlike the prior art, the loadwheel of the invention does not suffer from harmonic related problems caused by the spoked construction of some prior art loadwheels.

While in a preferred embodiment discs 516, 518 engage the wall 512 around the entire periphery thereof, it will be recognized that the inventive concept involves supporting the wall at substantially its entire periphery. Further, it should be appreciated that the number and exact positioning of discs which support the outer wall of the loadwheel may be varied without departing from the teachings of the invention. For example, the center disc 518 may be omitted as long as the remaining disc or discs sufficiently supports the wall of the loadwheel during testing so that the load cells generate accurate signals corresponding to irregularities in the tire.

Additionally, as seen in FIG. 8, outer discs 516 preferably are conically-shaped members which diverge from each other in a direction extending from hub 514 toward outer wall 512. The loadwheel 510 preferably is formed as a weldment, i.e., a welded assembly comprising the hub, outer wall, and discs. In a preferred embodiment, the loadwheel is an aluminum weldment. Forming the loadwheel as a weldment rather than a casting (as in the prior art) reduces manufacturing cost while providing a structurally rigid component. Of course, materials other than aluminum may be used to form the loadwheel 510. Also, the loadwheel need not necessarily be formed as a welded assembly, although that is preferred for reasons of reduced cost. An advantage of the invention is that conventional testing machines may be retrofitted to include the improved loadwheel.

Turning now to FIG. 5, C-shaped carriage 550 is shown to include an upper horizontal leg 552, a lower horizontal leg 554, and a vertical connecting leg 556 extending therebetween. The end portions 553, 555 of carriage legs 552, 554 are formed to include stepped or recessed areas (FIG. 7) attached to (or alternatively formed integrally with) mounting pads 558, 560. Pads 558, 560 mount the spindles 522, 524 of loadwheel 510 and the load cells 530, 540. The manner in which the spindles and load cells are affixed to the carriage legs is known in the art and thus will not be discussed in detail herein. As seen in phantom in FIG. 5, the ends of hub 514 are provided with threaded holes for securing end plates having bearings via which the loadwheel 510 rotates about the spindles, as is conventional.

Figure 7:
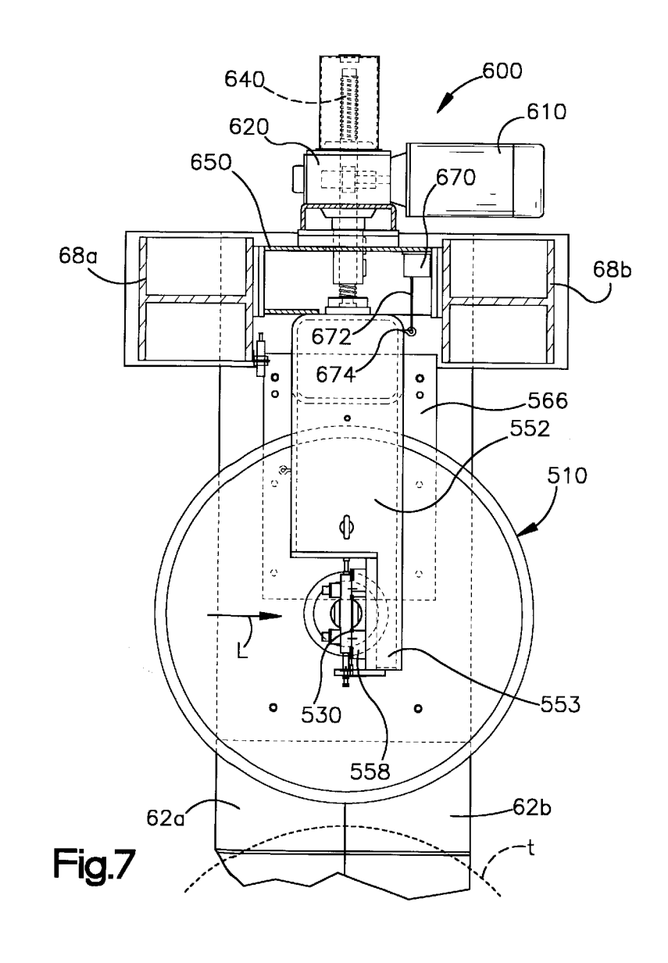
FIG. 7 is a plan view of the loadwheel assembly of FIG. 5 with portions removed for clarity.

As is evident from FIG. 7, in which mounting plate 566 is shown in phantom for better illustration of the carriage structure, load cells 530, 540 are accessible only from the side of each carriage leg provided with the mounting pad (i.e., the side indicated by arrow L). As discussed below, the invention permits the carriage 550 to be mounted to the machine frame 60 (FIG. 4) in two different positions so that the mounting pads of the carriage legs can face either side of the machine, thereby overcoming load cell accessibility problems present in prior art machines.

Figure 6:
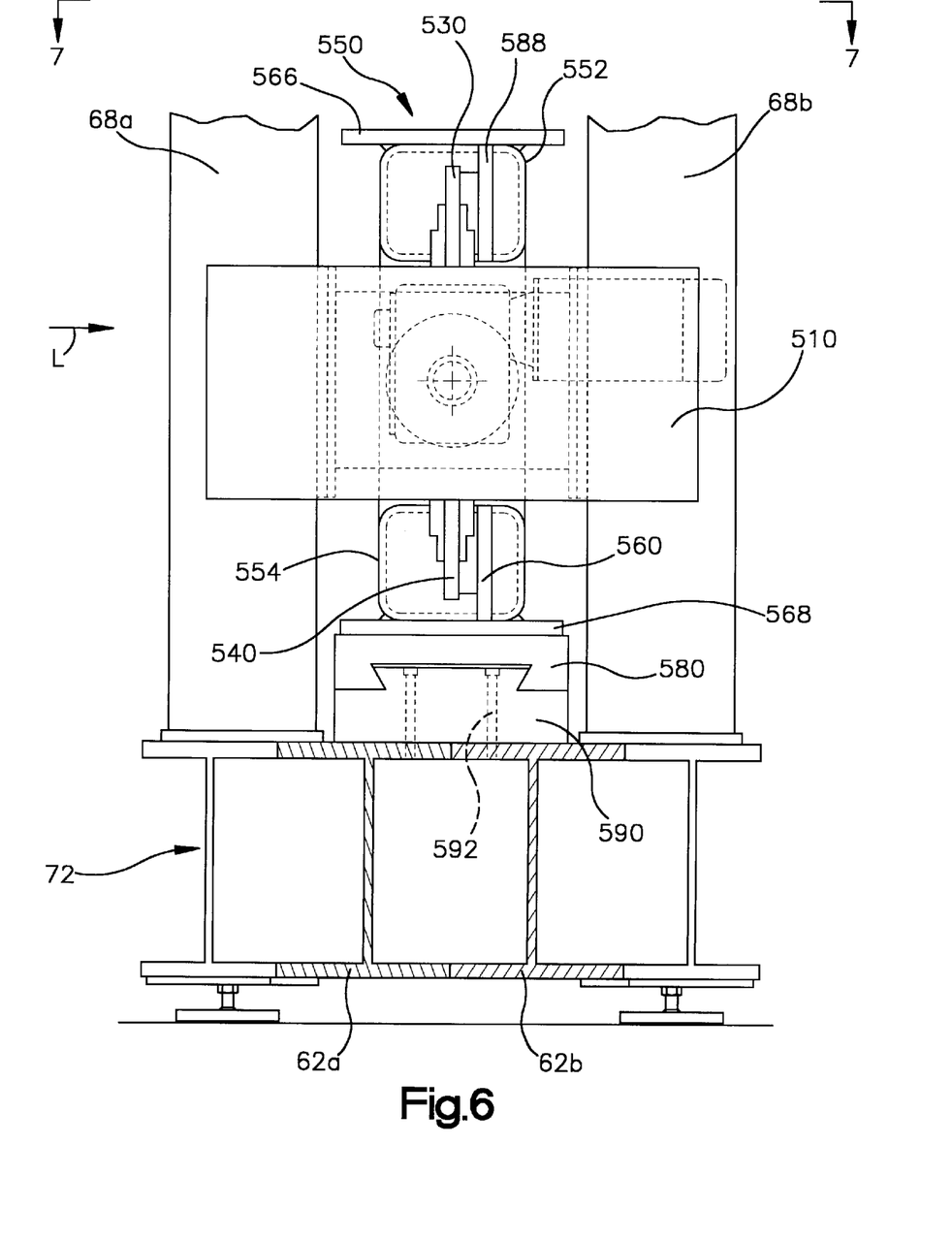
FIG. 6 is an end elevational view of the loadwheel assembly taken along the direction of arrows 6—6 in FIG. 5.

In particular, as best seen in FIGS. 5 and 6, outer surfaces 562, 564 of upper and lower carriage legs 552, 554 are provided with mounting plates 566, 568. Each mounting plate may be detachably secured to a guide piece 580 configured to slidably mate with a support 590. The support 590 is fixed to beam 72 of machine frame 60 by any suitable fastening means 592, such as screws, bolts, a welded connection, etc. Similarly, guide piece 580 is attached to either mounting plate 566 or 568 via any suitable connection which permits detachment of the guide piece 580, such as threaded connectors which may easily be disconnected to allow guide piece 580 to be attached to the other mounting plate.

The guide piece 580 and support 590 cooperate to facilitate sliding of the carriage 550 toward and away from the tire. In a preferred embodiment, the guide piece 580 and support 590 are formed with mating dovetail portions which lock the respective components in position while permitting the carriage 550 and loadwheel 510 to slide relative to the tire held by the chuck assembly. While a dovetail connection between the guide piece 580 and support 590 is the preferred means of slidably connecting the components, it should be appreciated that alternative connections may be used to secure the carriage in position while allowing movement of same toward or away from the tire.

In the arrangement shown in the Figures, and in particular FIGS. 6 and 7, the carriage 550 is mounted such that the load cells 530, 540 are accessible from the left side of the carriage (when viewing the carriage head on as in FIG. 6). Thus, in order to access the load cells for maintenance or replacement purposes, one must approach the carriage from the left side of the machine (in the direction of arrow L). However, depending on the specific arrangement of the tire testing system, it may be desirable or necessary to access the load cells from the opposite side of the carriage. In this situation, prior art loadwheel assemblies are inadequate in that the carriage was securable to the frame in only one position. This caused considerable difficulty when it became time to replace the load cells, for example, by requiring removal of one or more system components to allow unimpeded access to the load cells.

The invention overcomes the aforesaid problems because carriage 550 is provided with means for permitting its mounting in alternate positions. In order to mount the carriage such that the load cells 530, 540 are accessible from the side opposite that shown in FIG. 6, the carriage is disconnected from drive mechanism 600 and removed from the machine frame by sliding guide piece 580 off support 590. The guide piece 580 then is detached from mounting plate 568 and attached to mounting plate 566. Next, the entire carriage 550 is rotated 180° along an axis perpendicular to the arrow L (i.e., along an axis passing into the plane of FIG. 6). The guide piece 580 then is slid onto support 590 and attached to drive mechanism 600. The resulting arrangement has load cells 530, 540 located on the opposite side of the machine from that shown in FIG. 6, with loadwheel 510 remaining in the same position. Accordingly, the invention permits the carriage 550 to be selectively mounted such that the load cells are accessible from either side of the machine frame. This feature constitutes a considerable improvement over prior art assemblies which limited access to the load cells to only one side of the carriage and frame.

Figure 3A:
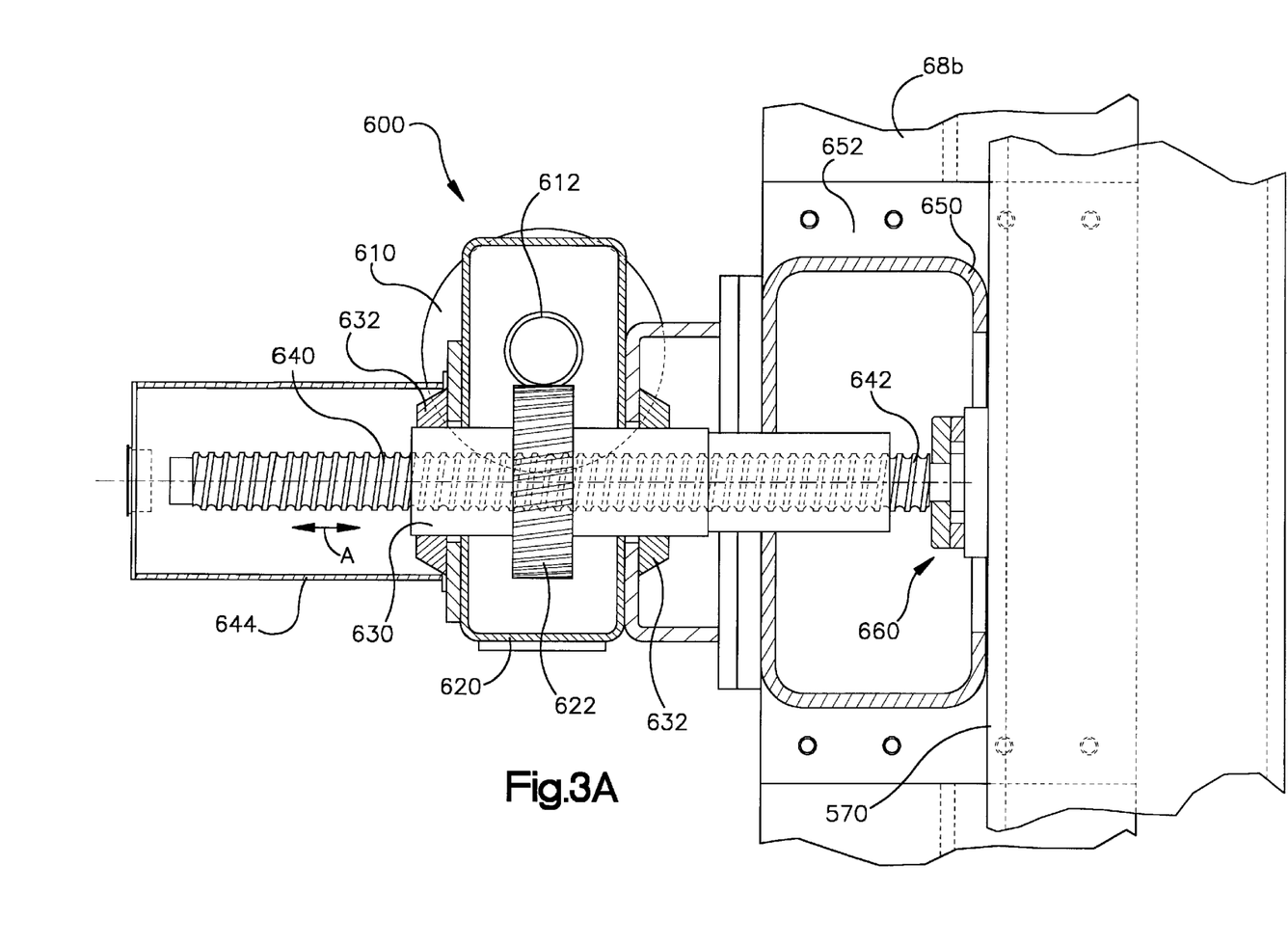
FIG. 3A is an enlarged view of the drive mechanism forming part of the loadwheel assembly shown in FIG. 3.

Drive mechanism 600 will now be described. FIGS. 3 and 3A show the carriage 550 in a retracted position relative to frame 60 in which the loadwheel 510 does not engage tire 20. As seen best in FIG. 3A, mechanism 600 comprises motor 610 having an output shaft 612 connected to a gearbox 620 provided with one or more gears 622 which step down the rotational output of motor 610. The gear 622 is fixed to a female member 630 preferably in the form of a threaded sleeve which is free to rotate within suitable bearings or bushings 632, but whose position is otherwise fixed. A threaded male member 640 preferably in the form of a ball screw is received within sleeve 630 and is driven laterally (i.e., to the left and right in FIG. 3A) upon rotation of screw 640. One end 642 of screw 640 is attached to the outer surface 570 of carriage leg 556 via a clamping assembly 660; thus, movement of screw 640 results in movement of carriage 550 and loadwheel 510 carried thereby. FIG. 5 shows (in somewhat exaggerated fashion) the carriage displaced from the frame columns such that the loadwheel engages the tire. A housing 644 preferably is attached to gearbox 620 and encloses the opposite end of ball screw 640 as well as a corresponding end of threaded sleeve 630. A box frame 650 preferably is fixed to frame column 68b by a flange or bracket portion 652 to enclose the end 642 of screw 640 and adjacent structure.

The motor 610 and gearbox 620 are integrated with and directly engage and rotate threaded sleeve 630 to drive screw 640 and carriage 550 toward and away from tire 20. The drive mechanism 600 provides a simplified structure as compared with prior art machines which typically include a motion transmitting device, e.g. a chain and sprocket assembly, disposed between the motor and the carriage. As such, the mechanism of the invention is less susceptible to breakdown than that of the prior art and, in addition, requires less maintenance due to the reduced number of components.

The invention also may be equipped with means for detecting and monitoring the distance the carriage 550 is displaced from machine frame 60. Preferably, as seen in FIG. 7, a sensor 670 is fixed to frame 60 and includes a string 672 one end of which is attached to carriage 550 as indicated at 674. Sensor 670 thus monitors the position of carriage 550 and loadwheel 510 carried thereon and generates an electrical signal that is fed to a suitable system control such as a microprocessor (not shown) which controls movement of the loadwheel to its proper position.

It is apparent that the present invention provides an improved loadwheel assembly which overcomes problems and limitations associated with prior art assemblies. The foregoing detailed description of preferred embodiments is made for purposes of providing a complete disclosure and should not be construed as limiting the scope and application of the inventive concepts disclosed herein, as many modifications and variations of the invention will be apparent to those skilled in the art.

What is claimed is:

1. A loadwheel assembly for use in a tire testing machine, the loadwheel assembly comprising:
   a carriage;
   a loadwheel rotatably mounted to the carriage, the loadwheel including:
   first and second ends;
   a substantially cylindrical wall extending between the first and second ends, the wall having an outer surface adapted to be contacted by a load;
   a hub spaced inwardly from the cylindrical wall;
   a pair of conically-shaped support plates disposed between the hub and the cylindrical wall adjacent the first and second ends and supporting the cylindrical wall around substantially the entire periphery thereof; and
   load cells provided adjacent to the first and second ends of the loadwheel, the load cells generating a signal corresponding to a force exerted on the loadwheel;
   said conically-shaped support plates diverging from a radial plane in a direction extending away from the hub and toward the cylindrical wall of the loadwheel.

2. A loadwheel assembly according to claim 1, wherein the support plates close off the ends of the loadwheel to define a hollow interior therebetween.

3. A loadwheel assembly according to claim 1, the loadwheel further comprising at least one additional support plate disposed between said pair of conically-shaped support plates and extending from a central portion of the hub toward a central portion of the cylindrical wall.

4. A loadwheel assembly according to claim 1, the loadwheel further comprising spindles attached to the carriage and located adjacent to the hub at said first and second ends, the spindles carrying the load cells and rotatably supporting the loadwheel.

5. A loadwheel assembly according to claim 4, wherein the carriage is generally C-shaped with upper and lower legs joined by a connecting leg, the spindles respectively secured to the upper and lower legs of the carriage and rotatably supporting the loadwheel.

6. A loadwheel assembly according to claim 1, wherein the carriage is mounted to a frame and is movable along the frame.

7. A loadwheel assembly according to claim 6, wherein the carriage is secured to a slide member with a dovetail portion disposed in a complementarily configured portion of said frame.

8. A loadwheel assembly according to claim 6, wherein the carriage has a plurality of mounting brackets provided at different locations on the carriage and the slide member is detachably securable to any one of the mounting brackets.

9. A loadwheel assembly according to claim 6, further comprising a motor with an output shaft, a threaded female member coupled to and rotated by the output shaft, a threaded male member attached to the carriage and received within the female member so as to be linearly movable relative thereto, wherein the motor rotates the threaded female member to move the threaded male member and carriage in a substantially linear direction relative to the frame.

10. A loadwheel assembly according to claim 9, wherein the threaded female member is a cylindrical sleeve with threads on an interior surface thereof, and the threaded male member is a ball screw, and the motor shaft drives a gear directly connected to the cylindrical sleeve.

11. A loadwheel assembly according to claim 1, wherein the carriage is slidably mounted to a frame and is movable along the frame, and further comprising means for moving the carriage along the frame.

12. The loadwheel assembly of claim 1, wherein a radially outward periphery of each of said conical-shaped support plates is attached to said cylindrical wall at a location spaced inwardly with respect to said first and second ends.

13. The loadwheel assembly of claim 1, wherein said conical-shaped support plates are located symmetrically along said hub.

14. The loadwheel assembly of claim 13, including a planar, annular support plate located intermediate said conical support plates.

15. A loadwheel for contacting a rotating load, the loadwheel comprising:
   a first end and a second end;
   a cylindrical wall extending between the first and second ends, the cylindrical wall having an outer surface adapted to be contacted by a load;
   a hub disposed between the first and second ends; and
   a pair of conically-shaped support plates secured to and extending between the hub and an interior of the cylindrical wall so as to support the cylindrical wall around substantially the entire periphery thereof, said conically-shaped support plates diverging in opposite directions with respect to each other.

16. A loadwheel according to claim 15, further comprising means for detecting forces exerted against the loadwheel.

17. A loadwheel according to claim 15, wherein three annular plates are secured to the loadwheel and are spaced along a length of the hub.

18. A loadwheel according to claim 15, wherein the loadwheel comprises a welded assembly.

19. A loadwheel assembly for contacting a load, the assembly comprising:
   a carriage;
   a loadwheel rotatably mounted to the carriage, the loadwheel including:
   first and second ends;
   a substantially cylindrical wall extending between the first and second ends, the wall having an outer surface adapted to be contacted by a load;
   a hub spaced inwardly from the cylindrical wall;
   load cells provided adjacent the first and second ends of the loadwheel, the load cells generating a signal corresponding to a force exerted on the load wheel;
   wherein the carriage has first and second sides and the load cells are disposed so as to be accessible from one of said first and second sides of the carriage; and
   means for mounting the carriage on a frame with the carriage side including the load cells selectively facing one of a plurality of directions to allow the load cells to be accessed from different directions.

* * * * *